United States Patent [19]

Simon et al.

[11] Patent Number: 4,507,208
[45] Date of Patent: Mar. 26, 1985

[54] PROCESS FOR HANDLING WASTE FROM OIL WELL OPERATIONS

[75] Inventors: Jules A. Simon; John A. Young; Michael D. Ford; Harold C. Bourgeois, all of Baton Rouge, La.

[73] Assignee: Drilling Waste, Incorporated, Baton Rouge, La.

[21] Appl. No.: 509,715

[22] Filed: Jun. 30, 1983

[51] Int. Cl.³ .............................................. C02F 1/52
[52] U.S. Cl. .................................... 210/721; 210/724; 210/778
[58] Field of Search ............... 210/694, 721, 724, 726, 210/727, 737, 759, 774, 778, 790, 806

[56] References Cited

U.S. PATENT DOCUMENTS

| | | | |
|---|---|---|---|
| 3,423,313 | 1/1969 | Messer | 210/734 |
| 3,433,312 | 3/1969 | Burdyn et al. | 210/734 X |
| 3,577,341 | 5/1971 | Keith et al. | 210/726 X |
| 3,578,586 | 5/1971 | Gal et al. | 210/734 X |
| 3,933,634 | 1/1976 | Seki | 210/778 X |

Primary Examiner—Thomas Wyse
Attorney, Agent, or Firm—Hubbard, Thurman, Turner & Tucker

[57] ABSTRACT

A process and apparatus are disclosed for separating drilling mud and waste materials into pure water and a concentrated solid waste phase which is easily handled and disposed of. The process and apparatus provide for adjusting the pH of the drilling mud and waste materials to be separated, mixing the thus pH adjusted mud and waste materials with a flocculating agent and allowing the solids to settle out. The solids are then removed and further dewatered to produce a relatively dry concentrated solid waste phase. If desired, the clarified water is mixed with finely divided activated charcoal to remove various impurities from the clarified water. The mixture of clarified water and charcoal are then filtered to produce a filtrate stream which is further separated to produce pure water and a liquid phase containing dissolved solids. The pure water can then be reused in the drilling process or safely discharged into the environment.

10 Claims, 1 Drawing Figure

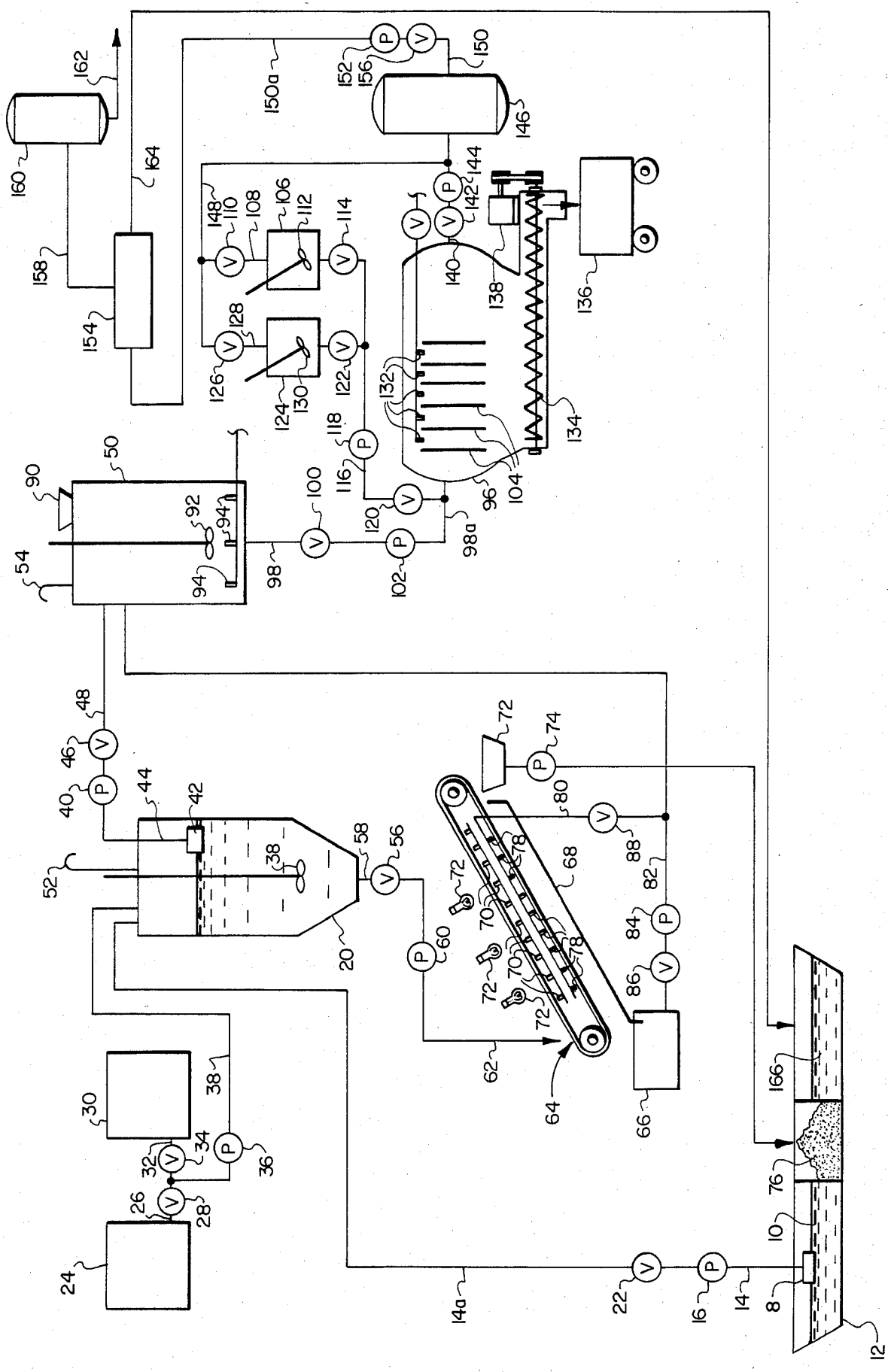

PROCESS FOR HANDLING WASTE FROM OIL WELL OPERATIONS

BACKGROUND OF THE INVENTION

This invention relates to a method and apparatus for separating drilling mud and waste materials into a concentrated solid phase that can be readily disposed of and a pure water phase.

It is well known that in the drilling of oil and gas wells, large quantities of water are used in the makeup of drilling mud. It is also well known that during the course of drilling operations, the drilling mud becomes contaminated with various materials and that both during the course of drilling and at the completion of drilling operations, the drilling mud must be disposed of. It is further well known that in drilling operations, various waste streams are produced from spillage, wash water that is used to wash down drilling rig equipment, galley waste and from rain water runoff and the like.

Heretofore, little attention has been paid to methods or equipment for disposing of drilling mud and waste materials. In most prior art land drilling operations, drilling mud and waste materials have been merely dumped into pits that are abandoned following the drilling operations. Unfortunately, in many drilling operations that are carried out on offshore rigs and along inland waterways, liquid waste streams from drilling operations have been merely discharged into the sea or into inland waterways. Recently, however, emphasis has been shifting toward ecologically safe disposal of drilling mud and waste materials. Now, severe limitations are placed on various drilling operations whereby drilling mud and waste materials can no longer be discharged into the environment or merely abandoned in open pits or other waste dumps at the end of drilling operations.

Several methods have been suggested for disposing of drilling mud and waste materials. Probably the most common method now employed in "safe" disposal of drilling mud and waste materials is to collect the drilling mud and waste materials into barges, trucks and the like and transport them to some location where the drilling mud and waste materials can be disposed of. Such a collection and transport pose several problems. The first problem is in the sheer volume of materials that must be collected, stored and transported to some treatment site. Secondly, handling of drilling mud and waste materials is difficult and very costly. Finally, such known methods as centrifuge separations, screening and the like still produce relatively viscous mud-like streams that are difficult to dispose of.

It is therefore an object of this invention to provide an improved method and apparatus for separating drilling mud and waste materials into a concentrated solid phase that can be easily disposed of and relatively pure water.

It is another object of this invention to provide an improved method and apparatus that can be used at or near a drilling site separate drilling mud and waste materials into a concentrated solid waste phase that be readily disposed of and relatively pure water.

It is yet another object of this invention to provide a method and apparatus for separating drilling mud and waste materials to provide relatively pure water that can be reused in the drilling operations or safely discharged into the environment.

SUMMARY OF THE INVENTION

The present invention is a process and apparatus for separating drilling mud and waste materials to produce relatively pure water and a concentrated solid waste phase that can be easily stored and disposed of. The process involves collecting the drilling mud and waste materials and adjusting the pH of the materials to be separated to less than 7. The thus pH adjusted drilling mud and waste materials are then mixed with a flocculating agent and the resulting mixture is allowed to settle to produce a clarified liquid phase and a phase that contains flocculated solids. The phase containing the flocculated solids is then placed on a suitable support surface and is dewatered by allowing liquid to drain from the flocculated solids. The thus dewatered solids are then collected, stored and disposed of in a known manner. The water that is removed from the dewatered solids is then combined with the clarified water phase and the resulting mixture of liquids can be mixed with finely divided activated charcoal to remove various organic materials therefrom. This combination of liquid and finely divided activated charcoal is then filtered to produce a second clarified liquid phase. The resulting second liquid phase is then subjected to a separation process to produce pure water and a relatively small liquid phase containing dissolved solids. The liquid phase containing dissolved solids is then stored and disposed of in a normal manner.

The apparatus of this invention can be assembled in such a manner whereby it can be skid-mounted, trailer mounted or barge mounted and transported to the drilling site whereby the drilling mud and waste materials can be separated at or near the drilling site to avoid the necessity of collecting and transporting drilling mud and waste materials over long distances to separate and/or dispose of them. The resulting pure water phase that is produced in the method and apparatus of this invention can be either reused in drilling operations or it can be safely discharged into the environment.

BRIEF DESCRIPTION OF THE DRAWING

FIG. 1 is a schematic block diagram showing the apparatus of the present invention.

DETAILED DESCRIPTION OF THE PREFERRED EMBODIMENTS

In carrying out the process of this invention, drilling mud and waste materials that are to be separated can be collected and stored using known methods and apparatus. For example, when drilling operations are carried out using land-based rigs, drilling mud and waste materials are normally collected and stored in earthen pits or in various mud vats and tanks. Waste materials such as washdown liquids are normally collected in ditches and troughs and are transferred to waste pits and various tanks. On offshore drilling operations, mud and waste materials are normally collected and stored in barges tied alongside the rig or on various tanks and vats. As shown in the drawing, drilling mud and waste materials 10 are stored in a compartment of barge 12. The drilling mud and waste materials 10 are normally rather viscous, heavy, colloidal suspensions of various solids in water. The water phase of the drilling mud and waste materials normally has large amounts of dissolved solids, such as salt, mud additives and the like dissolved therein. In many instances, the drilling mud and waste materials normally found in drilling operations will be contaminated with oil, various chemicals used in the drilling and production operations and the like.

As shown in the drawing, the material to be treated in accordance with the instant invention is transferred from barge 12 by means of transfer conduit 14 by use of pump 16. If desired, transfer conduit 14 can be equipped with an immersible filter 18 which serves to filter out large particles such as sand, rock cuttings and the like. It has been found desirable to use some type of filter to prevent the large particulate material which is normally found in drilling mud from damaging pump 16. Pump 16 transfers the material to be treated in accordance with this invention to mixing and settling tank 20 through conduit 14a with control valve 22 controlling the flow of the drilling mud and waste material through transfer conduit 14a.

Mixing and settling tank 20 is utilized as a liquid clarification and settling zone wherein the drilling mud and waste material is initially separated into a heavy phase containing flocculated solids and a clarified liquid phase. In carrying out the process of this invention, it has been found that it may be desirable to adjust the pH of the materials in some instances to either a neutral pH or to a slightly acid pH. Therefore, the preferred embodiments of the process and apparatus of this invention include holding tank 24 which is utilized to hold a pH adjusting agent that is added to the materials to be treated. It has been found that various types of acids such as sulfuric acid, acetic acid, and other mineral acids can be utilized to lower the pH of the materials to be treated. However, in a preferred embodiment of this invention, aluminum sulfate is utilized to adjust the pH of the drilling mud and waste material to a level where it is slightly acidic. As shown in the drawing, aluminum sulfate is contained in holding tank 24. Aluminum sulfate is withdrawn from holding tank 24 through conduit 26 with the amount of aluminum sulfate being controlled by valve means 28.

In order to initially separate the drilling mud and waste materials in mixing and settling tank 20, it has been found desirable to add a flocculating agent. Holding tank 30 is utilized to contain to flocculating agent. The flocculating agent is withdrawn from holding tank 30 through conduit 32 with valve means 34 controlling the amount of flocculating agent that is withdrawn.

Pump means 36 is utilized to transfer the pH adjusting agent from holding tank 24 and the flocculating agent from holding tank 30. The flocculating agent and the pH adjusting agent are added to mixing and settling tank 20 by passage through conduit 38.

It will be appreciated that the initial clarification step wherein the drilling mud and waste materials are separated into a phase containing flocculated solids and a clarified liquid phase is best carried out in a batch mode. Therefore, in operation of the present invention, the material to be treated in accordance with the instant invention is added to mixing and settling tank 20 through transfer conduit 14a. Then, the pH adjusting material is pumped from holding tank 24 by means of pump 36 to enter mixing and settling tank 20 through conduit 38. Once the batch of drilling mud and waste materials are treated to adjust the pH to the desired level, valve 28 is closed and valve 34 is opened whereby the flocculating agent from holding tank 30 is pumped into mixing and settling tank 20 by means of pump 36. Disposed within mixing and holding tank 20 is suitable agitating means 38 which is utilized to thoroughly mix the material to be treated with the pH adjusting agent and with the flocculating agent.

Following a complete mixing of the pH adjusting agent with the drilling mud and waste materials and following the thorough mixing of the flocculating agent in mixing and settling tank 20, agitator 38 is turned off and the entire mixture is allowed to settle out whereby the solids in the drilling mud and waste materials are flocculated out and settle to the bottom of mixing and settling tank 20. In a preferred embodiment of this invention, aluminum sulfate is added to the mixing and settling tank to adjust the pH of the drilling mud and waste materials to a range of from about 6 to about 7. Thereafter, the flocculating agent can be added to the mixing and settling tanks. Flocculating agents are well known in the art. Therefore, any of the known flocculating agents, such as organic polymers, salts and the like, can be used in this invention.

A preferred flocculating agent is a blend of cationic polymers such as a blend of cationic polymer materials sold by the Betz Chemical Company under the trademark BETZ 1155 and BETZ 1158 or materials marketed by Allied Chemical under the traemark POLYFLOC which is a polyacrylamide. By blending these cationic polymer materials together, an effective flocculating agent is produced. To facilitate the handling of such polymer materials, they are normally suspended in water and placed in holding tank 30. It has been found that by adding one-half of the flocculating agent initially and then allowing the resulting mixture of drilling mud and waste to settle, a significant amount of clarified water is produced. Thus, for example, after agitator 38 stops, after a settling time of from about 10 to 15 minutes, solids in the drilling mud and waste materials will begin to settle out and a significant amount of clarified water is found above the phase containing the solids. The clarified water can be removed from settling and holding tank 20 by means of pump 40. Pump 40 is attached to a floating suction pickup 42 by means of suction line 44. The output of pump 40 can be controlled by means of valve 46. The output from the pump is transferred through transfer conduit 48 into mixing tank 50. After the initial settling and withdrawal of the first produced clarified liquid, additional flocculating agent is added to the drilling mud and waste materials in mixing and settling tank 20. It has been found that by using a two-step addition of flocculating agent, more efficient flocculation of suspended solids is obtained using a given amount of flocculating agent. It will be appreciated that when the second portion of the flocculating agent is added to the material in mixing and settling tank 20, it is again necessary to use agitator 38 to insure a thorough mixing of the flocculating agents with the material to be treated. Once the mixing is completed, agitator 38 is turned off and additional solids are flocculated and settle to the bottom of mixing and settling tank 20. It has been found that the mixing and settling process in tank 20 can be carried out at ambient temperature and pressure.

At the completion of the second settling step, pump 40 is again activated and floating suction 42 is utilized to pump the second produced clarified liquid from mixing and settling tank 20 into tank 50.

It will be appreciated that both mixing and settling tank 20 and mixing tank 50 can be vented to the atmosphere by means of vent lines 52 and 54. However, if the drilling mud and waste materials have large amounts of volatile components therein, it may be desirable to have vent lines 52 and 54 affixed to some type of vapor recovery system or to some type of absorbent canister system to absorb any volatile materials before they escape into the atmosphere.

Following the removal of a substantial portion of the clarified liquid from mixing and settling tank 20, valve means 56 can be opened to remova a relatively thick, viscous phase that contains the flocculated solids through transfer conduit 58. It will be noted that the bottom walls of mixing and settling tank 20 are inclined to facilitate removal of the phase that contains the flocculated solids. If desired, pump or auger means 60 can be used to transfer the phase that contains the flocculated solids from mixing and settling tank 20. The phase that contains the flocculated solids is passed through transfer conduit 62 and is deposited on a support structure such as an inclined mud filter. The mud filter is utilized to dewater the flocculated solids phase. Normally, the phase that contains the flocculated solids will be a rather jelly-like phase. It has been found that the jelly-like suspension of flocculated solids can be further dewatered by placing the solids on a support surface to allow the water to drain therefrom. Therefore, in a preferred embodiment of this invention, an inclined screen mud filter is utilized to deposit the suspension of flocculated solids thereon to allow water to drain therefrom.

Moving mud filter 64 is preferably an endless belt-type mud filter that is inclined on an angle from about 15° to 30° above the horizon. As the jelly-like mass containing flocculated solids is transferred through transfer conduit 62, it is evenly spread across the surface of the moving belt screen 64 by means of a distribution header scraper that will evenly spread the solids across the surface of the moving screen.

It has been found that an optimum screen size is about 20 mesh which will allow effective dewatering of the flocculated solids without appreciable amounts of the solids falling through the screen. The flocculated solids are very fluid-like which prevents the use of conventional shaker screens or filters for dewatering the solids. It has been found that most of the water that is contained in the phase containing the flocculated solids will flow or drain off of the surface of the solids as the solids are supported on the moving mud filter screen. The water that flows from the flocculated solids is connected in tank 66 that is disposed below the lower end of the inclined mud filter 64. Inclined ramp 68 is disposed under the lower side of the mud filter 64 to collect the water dripping through the mud screen and divert it to collector tank 46. In order to assist in the dewatering of the flocculated solids, air jets 70 can be disposed along the underside of mud filter 64 to direct air upwardly through the screen and through the flocculated solids that are contained along the upper surface of the moving mud screen 64. In order to further dewater the flocculated solids, heat lamp 72 can be disposed above the solids to heat the upper surface of the flocculated solids as they are transported by movement of the screen on mud filter 64. By the time the flocculated solids reach the top of mud filter 64, they are relatively dry and dewatered and can be easily collected in solids hopper 72. The thus collected solids can then be transferred using known solids transfer equipment such as screw auger 74 which can be utilized to transfer the solids to an appropriate strorage compartment, such as compartment 76 in barge 12. These solid material can then be easily disposed of in any known manner such as by transporting them to a conventional land fill site.

Although most of the solids will be removed from the surface of mud filter 64 as it rotates over solids hopper 72, it is desirable to at least periodically wash the mesh screen surface of the endless belt on mud filter 64. Therefore, wash jets 78 can be positioned to wash the endless screen belt using water that is collected in collection tank 66. Water is supplied to wash jets 78 through conduit 80 which is operably connected to transfer line 82 which is utilized to transfer collected water from collection tank 66 using pump 84 and valve means 86 to withdraw collected water from the base of mud filter 64 and transfer it to second mixing tank 50. Therefore, by opening valve 88, wash jets 78 can be activated to remove flocculated solids that may be adhering to the surfaces of mud filter 64. Periodically, it may be desirable to remove solid materials from the bottom of collection tank 66 and dispose of them or to place them on the surface of mud filter 64 in the vicinity of transfer conduit 62 so they may be at least partially dried and removed from the system and stored along with the other solid components in storage zone 76.

The combined clarified water from mixing and settling tank 20 and the water that is withdrawn through conduit 82 can then be subjected to a process for removing dissolved solids or, if it is desired to remove any dissolved organics from the combined streams, a treatment with activated carbon can be utilized prior to dissolved solids removal. Mixing tank 50 is utilized to mix the just clarified water streams with activated charcoal to remove additional impurities from the clarified water. Finely divided activated charcoal is added to mixing tank 50 through hopper 90. Agitator 92 is activated to thoroughly mix activated charcoal with the clarified water in mixing tank 50. The purpose of adding the finely divided activated charcoal is to utilize the absorbent properties of charcoal to absorb various organic materials that may be dissolved or suspended in the clarified water. In order to insure that a substantial amount of dissolved organic materials in the clarified water are absorbed by the charcoal, a minimum of one hour of mixing is preferred. In order to insure that the final biological oxygen demand of water produced in accordance with the instant invention is sufficiently low, it may be desirable to carry out an additional oxygen-treating step in mixing tank 50 whereby air can be sparged into the bottom of mixing tank 50 through sparge nozzles 94. In some instances, it may also be desirable to add hydrogen peroxide through opening 90 in the top of mixing tank 50 to insure in the oxygen treatment of the water in mixing tank 50 to further decrease the biological oxygen demand levels of the water therein. In some instances, especially where the initial drilling mud and waste materials are contaminated with large amounts of organic materials, an oily film or layer may appear on the top of the water in mixing tank 50. In such instances, the oily layer can be removed from mixing tank 50 by means of a floating suction nozzle or by a skimmer means disposed in the top of mixing tank 50.

Following the thorough mixing of the activated charcoal with the required agitation time and following any oxygen treatment of the water in mixing tank 50, the thus treated water is then subjected to a liquid filtration process in liquid filter 96. The thus treated water is removed from the bottom of mixing tank 50 through transfer conduit 98 by opening valve 100 and activating pump 102 to discharge the water through transfer conduit 98a into filter 96. If desired, a suitable holding tank can be disposed between mixing tank 50 and filter 96 since mixing tank 50 is cycled on a batch cycle while filter means 96 is normally a continuous process.

The most preferred type of filter means for removing the particles of activated charcoal from the thus treated water is a dry cake discharge design filter having filter leaves that are precoated in a precise manner. As shown in the drawing, individual filter leaves 104 are disposed within filter 96. The filter leaves are precoated by using a slurry of any suitable filter aid such as diatomaceous earth and the like. For example, commercial filter aids such as FILTROL BRAND filter aid is quite useful since it is a highly absorbent precoat material. Therefore, FILTROL precoat material can be contained in precoat holding tank 106. As will be described hereinafter, makeup water for the precoating process can be added to precoat filter tank 106 through inlet conduit 108 by opening valve 110 and by activating agitator 112. When the desired amount of water is present in precoat filter tank 106, valve 110 is closed and valve 114 is then opened and the slurry of the precoat material is transferred through transfer conduit 116 by means of activating precoat pump 118 and opening valve 120. When filter leaves 104 have been coated with a layer of about one-eighth inch of the filter aid, valve 114 is closed and then valve 122 is opened and a slurry of finely divided activated charcoal and water from precoat tank 124 is then pumped by means of precoat pump 118 into contact with filter leaves 104 to deposit approximately one-eighth inch of carbon across the leaves of filter 96. The slurry of charcoal is produced by adding finely divided charcoal into precoat tank 24, opening valve 126 to add makeup water through transfer line 128 and activating agitator means 130.

Following the deposition of the finely divided activated charcoal on the filter leaves, valve 122 is closed and then valve 114 is again opened and an additional layer of the filter aid is pumped, by means of pump 118, into filter 96 to deposit an additional layer of the filter aid across the filter leaves. Thus, there is a sandwich-type effect whereby a unique filter coat is built up with filter aid being in direct contact with the filter leaves and a layer of activated carbon being laminated between the outer layer of the filter aid.

It has been found that filter 96 functions very effectively to both filter out any suspended solids that may be in the water coming from mixing tank 50 and the activated carbon layer on the filter leaves will serve to remove any remaining organic materials that may be present in the water being filtered. The filter 96 can be of any known construction. However, the filters made by U.S. Filter Corporation are quite effective. Preferably, filter 96 is a filter having a horizontal housing with vertically supported leaves that are rigidly connected to a horizontal shaft. As solids build up on the surface of the precoated leaves, the leaves are rotated and at the end of each cycle, the filter is drained of liquid and air is blown across the surface of the filter leaves by means of air jets 132 to dry the filter cake. After the jets have completed the drying process, the air flow is discontinued and the support shaft in the filter rotates all of the filter leaves against a stationary blade scraper to scrape the filter coat from the leaves. A screw auger is used to transport the dried filter cake out of the filter vessel and to deposit it into storage hopper 136 for disposal. Screw auger 134 can be powered by suitable electric drive means 138 which is affixed to the base of the filter mechanism. If desired, storage hopper 136 can then be moved to a point where it can be discharged into storage bin 76, such as in the storage barge illustrated in the figures or transferred to disposal sites, such as a land fill site. Following the scraping of the filter coat, the precoat procedure is again repeated and the laminated filter cake can be produced.

During the filtering operation, the water to be treated and filtered is passed into filter 96 by means of inlet conduit 98a. The water is discharged and removed from the filter by means of transfer conduit 140 by opening valve 142 and pumping the water by means of water pump 144 into storage tank 146. During the period of time of makeup of the filter coat, this clean water is pumped through makeup header 148 into precoat holding tanks 106 and 124 as previously described. Due to the cyclic nature of filter 96, water holding tank 146 is utilized to hold filtered water prior to its final cleanup. While filtered water, as it exits filter 96, is substantially free of particulate matter and organic materials, it still contains dissolved solids such as salts, various soluble chemical additives that are used in drilling and production operations and the like. Therefore, such water is usually undesirable for recycling to the drilling operations or for discharge into the environment. In view of this, the water is generally subjected to a final cleanup process to remove all such dissolved materials. Water from holding tank 146 is withdrawn through exit line 150 by means of pump 152 and passed by means of transfer conduit 150a to cleanup unit 154. Valve 156 can be utilized to regulate the flow of water to cleanup unit 154.

Cleanup unit 154 can be any known type of unit for producing pure water from aqeuous streams that contain dissolved solids. One particularly suitable type of cleanup unit is a vapor compression distillation unit which is also well known in the art for distilling salt water to produce drinking water. Cleanup unit 154 can be any type of distillation unit for final water cleanup. Another suitable type of final cleanup unit is a reverse osmosis unit that uses a semi-permeable membrane element to separate contaminated aqueous streams into a relatively pure water stream and an aqueous stream that contains a high percentage of dissolved solids. Of course, desalination of water by using reverse osmosis systems is well known in the art and is described in such references as U.S. Pat. Nos. 3,821,108 and 4,161,445. One commercially available reverse osmosis unit that can be used in the process of this invention is the DE-SAL ONE unit which is manufactured by Desalination Systems, Inc. of Escondido, Calif. As shown in the drawing, reverse osmosis unit 154 produces a stream of substantially pure water with no appreciable amounts of dissolved solids which is removed from reverse osmosis unit 154 through transfer conduit 158 and passed to holding tank 160. This substantially pure water can then be removed from holding tank 160 through conduit 162 and either reused in drilling operations or discharged directly into the environment. Although the drawing does not illustrate backwash piping and valving, it will be appreciated that such backwash piping and valving will be present in reverse osmosis unit 154. The brine stream which is a concentrated stream of dissolved solids and waste water is removed from reverse osmosis unit 154 through conduit 164 and is passed to a suitable storage container for later disposal. For example, conduit 164 can pass the concentrated brine stream to compartment 166 in transfer barge 12 for removal from the drilling site.

It will be appreciated that while the foregoing disclosure has been directed to the separation of drilling mud and drilling waste materials, the process can also be utilized for various cleanup and land reclamation processes wherein abandoned mud pits and the like are pumped out and the land surrounding such mud pits is reclaimed.

The apparatus used in the instant invention can be conveniently mounted on mobile barges, trailer trucks, skid pallets and the like for easy transport to remote drilling sites. It will be appreciated that by using the instantly disclosed invention, substantial savings in collecting, storing and transporting large volumes of waste drilling mud and other drilling wastes can be achieved. Thus, the only waste materials that need be transferred from a drilling site using the instantly disclosed method and apparatus will be relatively dry solid materials and brine that contains a high percentage of dissolved solids.

It is understood that various modifications and changes may be made in the foregoing disclosure without departing from the spirit and scope of this invention.

We claim:

1. A process for separating drilling mud and waste materials which comprises mixing the drilling mud and waste materials with a flocculating agent, allowing the mixture of flocculating agent and drilling mud and waste materials to separate into a first clarified liquid phase and a phase containing flocculated solids, separating said first clarified liquid phase from said phase containing flocculating solids, placing said phase containing flocculated solids on an inclined surface to allow liquid to drain from said flocculated solids, collecting and storing the thus dewatered flocculated solids, collecting liquid from said inclined surface which has drained from said dewatered flocculated solids, combining the thus collected liquid with said first clarified liquid phase to produce a second clarified liquid phase, filtering said second clarified liquid phase to produce a filtrate stream and separating said clarified liquid phase to produce substantially pure water and a liquid phase containing dissolved solids.

2. The process of claim 1 wherein said second clarified liquid phase is mixed with finely divided activated carbon prior to filtering.

3. The process of claim 2 wherein the mixture of said second clarified liquid phase and finely divided activated carbon is treated with air prior to said filtering.

4. The process of claim 3 wherein hydrogen peroxide is added to said mixture of said second clarified lidquid phase and finely divided activated carbon prior to said filtering.

5. The process of claim 1 wherein air is directed through the flocculated solids on said inclined surface.

6. The process of claim 5 wherein said flocculated solids are heated on said inclined surface to further dewater said solids.

7. The process of claim 1 wherein said flocculating agent is added in two parts with a portion of said flocculating agent being added to said drilling mud and waste materials, allowing said mixture of flocculating waste materials to separate into a first clarified liquid phase and a phase containing flocculated solids, separating said first clarified liquid from said phase containing flocculated solids, adding the remainder of said flocculating agent and allowing the mixture of said remainder of said flocculating agent and said phase containing flocculating solids to separate to form additional first clarified liquid.

8. The process of claim 1 wherein the pH of said drilling mud and waste materials is adjusted to a pH of less than 7 prior to addition of said flocculating agent.

9. The process of claim 1 wherein aid pH is adjusted by adding aluminum sulfate to said drilling mud and waste materials.

10. The process of claim 1 wherein said filtering is carried out by passing said second clarified liquid phase through a leaf filter having a filter cake disposed on the filter leaves which includes a layer of activated carbon.

* * * * *